United States Patent
Nishimura et al.

(10) Patent No.: US 7,553,442 B2
(45) Date of Patent: Jun. 30, 2009

(54) METHOD OF MANUFACTURING AN EXHAUST GAS PURIFYING FILTER

(75) Inventors: Mamoru Nishimura, Nagoya (JP); Mikio Ishihara, Kariya (JP); Hirofumi Yamashita, Tokoname (JP); Hiromi Sano, Nagoya (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 11/727,438

(22) Filed: Mar. 27, 2007

(65) Prior Publication Data
US 2007/0163117 A1 Jul. 19, 2007

Related U.S. Application Data

(62) Division of application No. 10/102,942, filed on Mar. 22, 2002, now abandoned.

(30) Foreign Application Priority Data

Mar. 28, 2001 (JP) ............................. 2001-093412
Feb. 8, 2002 (JP) ............................. 2002-032780

(51) Int. Cl.
*B28B 3/20* (2006.01)
(52) U.S. Cl. ...................................... 264/630; 264/631
(58) Field of Classification Search ................. 264/630, 264/631
See application file for complete search history.

(56) References Cited

U.S. PATENT DOCUMENTS

| 4,632,683 A | 12/1986 | Fukutani et al. |
| 5,069,697 A | 12/1991 | Hamaguchi et al. |
| 5,185,110 A | 2/1993 | Hamaguchi et al. |
| 5,545,243 A | 8/1996 | Kotani et al. |
| 6,887,826 B2 | 5/2005 | Nishimura et al. |

FOREIGN PATENT DOCUMENTS

| EP | 0 736 503 A1 | 10/1996 |
| EP | 0 753 490 A1 | 1/1997 |
| JP | A 61-129015 | 6/1986 |
| JP | A 6-327921 | 11/1994 |
| JP | B2 7-38930 | 5/1995 |
| JP | A 7-163823 | 6/1995 |
| JP | B2 2578176 | 11/1996 |
| JP | A 9-29024 | 2/1997 |
| JP | A 9-77573 | 3/1997 |
| JP | A 9-158710 | 6/1997 |
| JP | B2 2726616 | 12/1997 |

*Primary Examiner*—Carlos Lopez
*Assistant Examiner*—Russell J Kemmerle, III
(74) *Attorney, Agent, or Firm*—Oliff & Berridge, PLC

(57) ABSTRACT

An exhaust gas purifying filter is made of a ceramic material in a honeycomb structure having introduction passages for introducing exhaust gas that includes particulate matter emitted from an internal combustion engine, porous walls that collect the particulate matter and exhaust passages for exhausting the exhaust gas after the particulate matter has been removed therefrom, with the porous walls supporting a catalyst for oxidizing and removing the particulate matter. The porosity of the porous wall is in a range from 55 to 80%, the mean pore size is in a range from 30 to 50 µm, and the total volume X of the pores included in the exhaust gas purifying filter and the volume Y of the pores that are not smaller than 100 µm satisfy the relation of inequality $Y/X \leq 0.05$.

6 Claims, 2 Drawing Sheets

METHOD OF MANUFACTURING AN EXHAUST GAS PURIFYING FILTER

This is a Division of application Ser. No. 10/102,942, filed Mar. 22, 2002. The disclosure of the prior application is hereby incorporated by reference herein in its entirety.

BACKGROUND OF THE INVENTION

1. Field of the Invention

The present invention relates to an exhaust gas purifying filter that is made of a ceramic material and is used for collecting particulate matter, such as fine carbon particles, emitted from internal combustion engines and oxidizing and removing the particulate matter by catalytic reaction, and to a method of manufacturing the same.

2. Description of the Related Art

Exhaust gas purifying filters made of ceramic materials have been used to collect particulate matter emitted from diesel engines.

Method for removing the particulate matter collected by an exhaust gas purifying filter employed in the prior art is the collection and burning process that burns and removes the particulate matter by heating it with a heater installed at a predetermined position. The filter used in the collection and: burning process is designed to have a pore size as small as possible with respect to the pressure loss and cause the particulate matter to accumulate on the filter surface, in order to collect the particulate matter surely on the filter surface as described in Japanese Unexamined Patent Publication No. H9-77573.

However, the collection and burning process has not been put into practice because the filter is susceptible to breakage or melting due to thermal stress generated when the accumulated particulate matter is removed by burning with the heater.

SUMMARY OF THE INVENTION

In consideration of the problems described above, the present invention has an object to provide an exhaust gas purifying filter that can prevent the filter from breaking and melting and has high capacity to remove the particulate matter, and a method of manufacturing the same.

A first aspect of the invention is an exhaust gas purifying filter made of a ceramic material in a honeycomb structure comprising introduction passages for introducing exhaust gas that includes particulate matter emitted from an internal combustion engine, porous walls that collect the particulate matter and exhaust passages for exhausting the exhaust gas after the particulate matter has been removed therefrom, with the porous walls supporting a catalyst for oxidizing and removing the particulate matter, wherein the porosity of the porous walls is in a range from 55 to 80%, and mean pore size is in a range from 30 to 50 µm, while the total volume X of the pores included in the exhaust gas purifying filter and the volume Y of the pores that are not smaller than 100 µm satisfy an inequality of $Y/X \leq 0.05$.

The exhaust gas purifying filter of the first aspect of the invention has porous walls that have a catalyst supported thereon and are disposed between the introduction passages and the exhaust passages. The catalyst is supported not only on the surfaces of the porous walls but also on the inner surfaces of the pores. As a result, when the exhaust gas introduced through the introduction passages flows toward the exhaust passages, the particulate matter is captured on the inner surfaces of the pores of the porous walls installed therebetween. The captured particulate matter is effectively oxidized by the catalyst that is supported thereon and is thereby removed. Thus the exhaust gas is purified.

Since porosity and mean pore size of the porous wall are in the ranges described above, the pores are relatively large in total volume and in size. This allows the particulate matter to enter deep into the pores of the porous walls, which results in a larger area whereon the catalyst reaction takes place.

The catalyst supported on the porous walls oxidizes and removes the particulate matter with high efficiency. This is achieved by efficiently accelerating the reaction of the particulate matter with oxygen included in the exhaust gas. Thus high performance in removing the particulate matter can be achieved.

The porosity and mean pore size that are set in the ranges described above also make it possible to prevent the filter from breaking and melting.

Also, because the total volume X of the pores included in the exhaust gas purifying filter and the volume Y of the pores that are not smaller than 100 µm satisfy the relation of inequality described above, thus high performance of removing the particulate matter can be achieved.

A second aspect of the invention is a method of manufacturing an exhaust gas purifying filter made of a ceramic material in a honeycomb structure comprising introduction passages for introducing exhaust gas that includes particulate matter emitted from an internal combustion engine, porous walls that collect the particulate matter and exhaust passages for exhausting the exhaust gas after the particulate matter has been removed therefrom, with the porous walls supporting a catalyst for oxidizing and removing the particulate matter, the porosity of the porous walls being in a range from 55 to 80%, and mean pore size being in a range from 30 to 50 µm, while the total volume X of the pores included in the exhaust gas purifying filter and the volume Y of the pores that are not smaller than 100 µm satisfy the relation of inequality $Y/X \leq 0.05$, wherein the exhaust gas purifying filter is made by firing a perform made in honeycomb structure from a mixture of ceramic powder and a foaming material with the foaming material expanding during the firing process, and adding the catalyst to be supported thereon.

According to the second aspect of the invention, the pores can be formed with the porosity and the mean pore size described above, as the foaming material expands when dried.

While the prior art technology is required to use a ceramic powder of large particle sizes in order to form relatively large pores having mean pore size of 40 µm or larger, ceramic powder of large particle sizes makes it difficult to form the exhaust gas purifying filter by extrusion molding. According to the second aspect of the invention, since the foaming material that expands when dried is used, it is not necessary to use a ceramic powder of large particle sizes and the exhaust gas purifying filter of honeycomb structure that has the mean pore size described above can be manufactured by the extrusion molding process.

Thus the second aspect of the invention makes it possible to manufacture the exhaust gas purifying filter of the first aspect of the invention that has the high performance described above.

DESCRIPTION OF THE PREFERRED EMBODIMENTS

Figure 1:
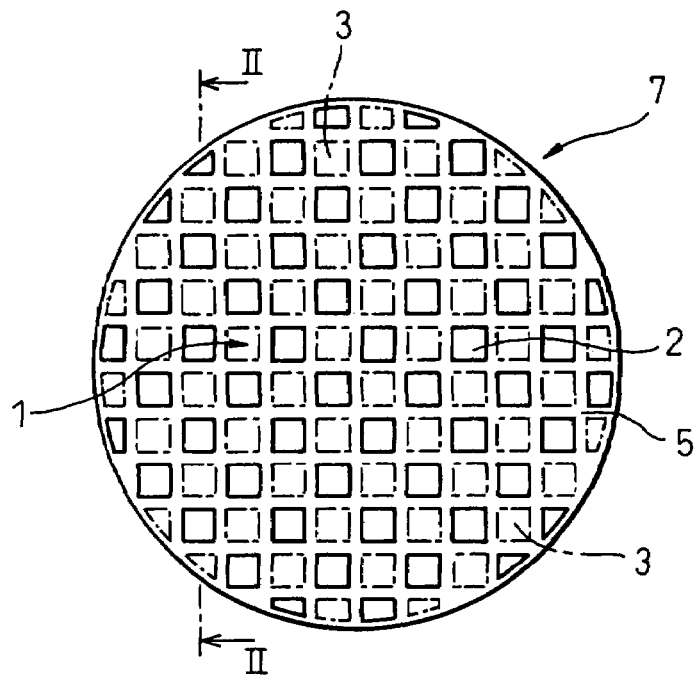
FIG. 1 is a front view of the exhaust gas purifying filter of an embodiment of the invention.

In case the porosity of the porous wall is less than 55% in the first aspect of the invention, pressure loss becomes too high for practical use due to buildup of the particulate matter on the surfaces of the porous walls. When the porosity is higher than 80%, strength of the exhaust gas purifying filter may become too low.

When the mean pore size of the porous walls is smaller than 30 μm, the particulate matter accumulates on the surface of the porous walls and hardly enters the inside of the porous walls. When the mean pore size is larger than 50 μm, the particulate passes through the porous walls because the pores are too large, resulting in a lower particle capturing efficiency.

In the first aspect of the invention, the total volume X of the pores included in the exhaust gas purifying filter and the volume Y of the pores that are not smaller than 100 μm satisfy the relation of inequality $Y/X \leq 0.05$.

As will be described later and shown in FIG. 3, as the particulate matter has sizes in a range from 0.1 to 20 μm, the particulate matter has a high probability of passing through the pores that measure 100 μm or more across. Thus in the case of $Y/X > 0.05$, the efficiency of capturing the particulate matter may decrease. It is more preferable that all the pores are smaller than 100 μm.

The catalyst is preferably a noble metal catalyst, since a noble metal catalyst such as platinum has a high capacity for catalytic reaction.

The exhaust gas purifying filter is preferably made by sintering at least one kind of material selected from among cordierite, silicon carbide and zirconium phosphate powder. This provides an exhaust gas purifying filter that has the pores of the characteristics described above.

The inner walls of the pores of the porous walls are preferably coated with alumina and the catalyst is supported thereon. Most alumina materials have large specific surface areas in a range from 100 to 200 g per liter. Accordingly, a larger area is available for the catalytic reaction that oxidizes the particulate matter, thereby accelerating the process of oxidizing and removing the particulate matter.

The exhaust gas purifying filter has honeycomb structure and is made in a cylinder having circular or oval cross section.

The exhaust gas purifying filter are mostly made in dimensions of 0.8 to 2.5 mm on one side of each cell, 0.1 to 0.6 mm in thickness of the porous wall, 50 to 300 mm in diameter and 50 to 200 mm in length, although the dimensions are not restricted to these values.

The porosity and mean pore size of the porous wall and the value of ratio Y/X in the second aspect of the invention are similar to these of the first aspect of the invention According to the second aspect of the invention, the mixture preferably includes carbon added thereto for the purpose of forming the pores. Carbon is burned and lost when firing the material that has been formed in honeycomb structure, thus leaving the pores. This makes it possible to form the porous walls that have multitude of pores.

Concentration of carbon to be added is preferably less than 40% for such reasons as preventing cracks from being generated by heat.

Concentration of the foaming material to be added to the ceramic powder is preferably less than 15% for such reasons as preventing the filter from being deformed.

The foaming material is preferably a mixture of a material of which 5 to 80% has been already expanded and an unexpanded material that expands at a temperature not higher than 100° C. The expanded material and the unexpanded material are pore forming materials used for forming the pores similarly to carbon. When heated to a low temperature for drying, the expanded material hardly expands but the unexpanded material expands. When fired, both materials are burned and lost so as to leave pores behind.

Since the unexpanded material is capable of forming a considerable number of pores, less heat is generated in the firing process and cracks are less likely to occur in the exhaust gas purifying filter.

The expanded material expands when heated to a relatively low temperature during the drying process, and is therefore capable of forming pores not only on the surface of the porous wall but also the inside thereof.

If only the unexpanded material is used, excessive expansion may cause the filter to deform. According to the present invention, as the expanded material as well as the unexpanded material is used, excessive expansion and also deformation of the filter can be prevented.

When the proportion of the expanded material to the entire foaming material added to the ceramic powder is below 5%, the foaming material undergoes excessive expansion as a whole, that may cause the filter to deform. When the proportion of the expanded material exceeds 80%, the perform made by extrusion molding has a low strength and may be deformed.

If the unexpanded material added to the ceramic powder is such that does not expand at 100° C. or lower temperatures, the foaming material as a whole may expand less and result in mean pore size smaller than the range described above.

The ratio of the expanded material to the unexpanded material is preferably in a range from 1:20 to 4:1. If the expanded material is included in a higher proportion and the unexpanded material in a lower proportion out of this range, the foaming material as a whole may expand less and result in mean pore size smaller than that described above. If the expanded material is included in a lower proportion and the unexpanded material in a higher proportion out of this range, the filter may be deformed.

For the expanded material, for example, "Microspheres" manufactured by Matsumoto Yushi-Seiyaku Co., Ltd. may be used.

For the unexpanded material, for example, "Microbeads" manufactured by Matsumoto Yushi-Seiyaku Co., Ltd. may be used.

The expanded material and the unexpanded material may be used in combination with carbon that is used for forming the pores.

For the ceramic powder, at least one kind of material selected from among cordierite, silicon carbide and zirconium phosphate powder is preferably used.

The cordierite is preferably formed by firing a mixture of talc, fused silica and aluminum hydroxide. This allows it to form multitude of pores in the porous walls. That is, water of crystallization included in aluminum hydroxide evaporates so as to leave a number of pores. The fused silica decomposes when fired, and forms pores through shrinkage. Thus the porosity can be made higher than in the prior art, to fall in the range described above.

Mean particle size is preferably from 30 to 200 μm for talc, from 30 to 200 μm for fused silica and from 5 to 20 μm for aluminum hydroxide. This allows it to have the porosity and mean pore size of the porous walls in the range described above. When the particle size of talc, fused silica and aluminum hydroxide are out of the ranges described above, the porosity and mean pore size of the porous walls may not be controlled within the range described above.

The exhaust gas purifying filter may be formed, for example, by kneading a mixture of the ceramic powder and the foaming material with water added thereto, and forming the material into honeycomb structure by extrusion molding. With this method, the exhaust gas purifying filter of honeycomb structure of desired dimensions can be easily made by cutting off after extrusion molding.

The perform of the exhaust gas purifying filter thus formed is dried so as to evaporate the water, at a relatively low temperature, for example, from about 80 to 100° C. Duration of heating is preferably determined in accordance to the size of the perform and other factors.

The perform of the exhaust gas purifying filter can be fired by keeping the perform at a temperature, for example, from about 1300 to 1500° C. for a period of 5 to 20 hours. Temperature and duration of firing are preferably determined in accordance to the size of the perform and other factors.

The drying process and the firing process may be carried out as separate processes, although the drying temperature may also be followed continuously by the firing temperature in an integrated heating process, which has an advantage of energy saving effect.

The cordierite is preferably formed by firing a mixture of talc, fused silica and aluminum hydroxide, with the mean particle size of aluminum hydroxide being set in a range from 5 to 20 μm, while total weight A of all particles included in the mixture and the cumulative weight B of particles included in the mixture having sizes of 100 μm and larger satisfy the relation of inequality $B/A \leqq 0.05$.

When the mean particle size of aluminum hydroxide is in the range described above, pores of the exhaust gas purifying filter can be controlled so that the mean pore size falls within a range from 30 to 50 μm during manufacturing. Also, because the total weight A of all particles included in the mixture and the cumulative weight of particles included in the mixture having sizes of 100 μm and larger satisfy the relation of inequality described above, the particulate matter can be captured with a high probability.

When the mean particle size of aluminum hydroxide is smaller than 5 μm, mean pore sizes may become too small to keep the pressure loss within a reasonable level. When the mean particle size of aluminum hydroxide is larger than 20 μm, significant number of pores become larger than 100 μm thus making it easy for the particulate to pass through the exhaust gas purifying filter.

If $B/A > 0.05$, a larger proportion of the particulate matter may pass through the filter.

EXAMPLES

Embodiments of the present invention will now be described in detail below.

In this example, ten kinds of exhaust gas purifying filter having different chemical compositions and different pore characteristics were manufactured. Among these, samples 6 through 9 are the exhaust gas purifying filters according to the present invention, and samples 1 through 5 and sample 10 are reference samples. All the samples were based on cordierite as the main component with a chemical composition consisting of 45 to 55% by weight of $SiO_2$, 33 to 42% by weight of $Al_2O_3$, and 12 to 18% by weight of MgO.

Figure 2:
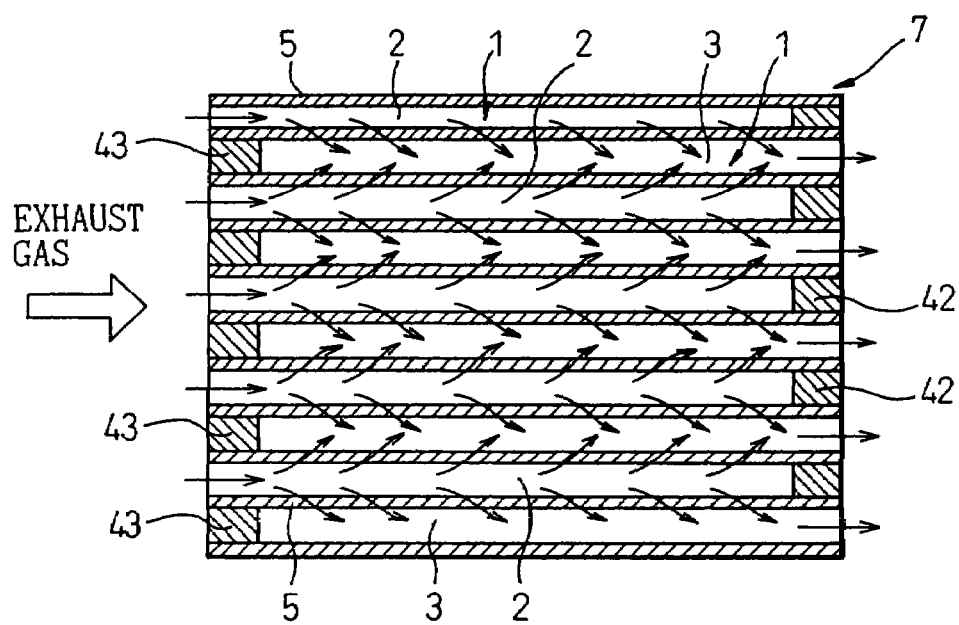
FIG. 2 is a sectional view of the embodiment taken along lines II-II in FIG. 1.

The exhaust gas purifying filter 7 has a cylindrical honeycomb structure of a circular cross section including a multitude of cells 1 that extend along the longitudinal direction as shown in FIG. 1 and FIG. 2. Half the cells serve as introduction passages 2 and the rest serve as exhaust passages 3. The cells are disposed alternately in the vertical and horizontal directions in the cross section in a checker work arrangement, while being separated from each other by porous walls 5. The surfaces of the porous walls 5 and the inner surfaces of pores 50 hold catalyst layers 51 having thickness of several micrometers and comprising alumina and a noble metal catalyst supported thereon.

The introduction passages 2 are open on the exhaust gas introducing side, and are closed with plugs 42 on the other end. The exhaust passages 3 are closed with plugs 43 on the exhaust gas introducing side and are open on the other end. Density of the cells 1 in the cross section perpendicular to the longitudinal direction of the exhaust gas purifying filter is 300 per 6.45 cm². The cell 1 measures 1.17 mm along one side of the cross section, and thickness of the porous wall 5 is 0.3 mm. The exhaust gas purifying filter measures 103 mm in diameter and 155 mm in length.

To capture the particulate matter with the exhaust gas purifying filter 7, the exhaust gas that includes the particulate is introduced into the introduction passages 2 as shown in FIG. 2. The exhaust gas that is introduced then passes through the porous walls 5 and enters the exhaust passages 3, since the introduction passages 2 are closed at the exhaust side.

Figure 3:
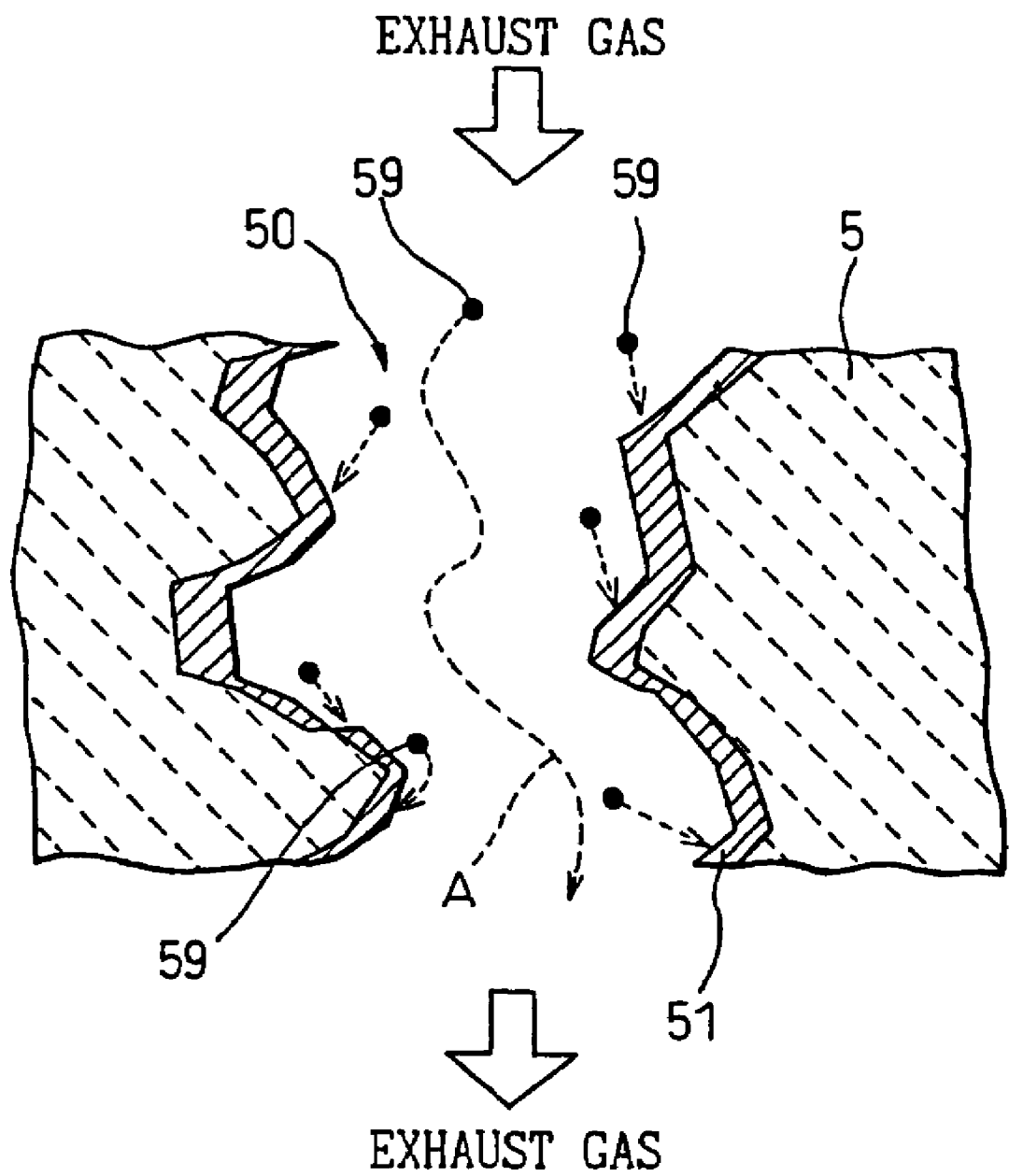
FIG. 3 shows pores in the exhaust gas purifying filter and particulate matter passing through the pores according to the embodiment.

At this time, the particulate matter 59 is captured in the pores 50 of the porous walls 5, as shown in FIG. 3. The exhaust gas is discharged from the open ends of the exhaust passages 3. Part of the particulate matter 59 may pass through the pores 50 (arrow A). If the pores 50 are larger than 100 μm, in particular, the particulate matter 59 often passes through the pores 50.

The particulate matter captured by the porous walls 5 reacts with oxygen included in the exhaust gas under the high temperature condition of the exhaust gas, so as to be oxidized and removed. The reaction is accelerated by the catalyst supported on the porous walls, so that oxidization proceeds efficiently.

To manufacture the exhaust gas purifying filter, cordierite forming material of the kind and quantity shown in Table 1 and Table 2 and combustible organic material were prepared.

Table 1 shows mixing proportions of the cordierite forming material and the pore forming material, and Table 2 shows the mean particle size of the cordierite forming material with the ratio of large particles of the cordierite forming material also being shown.

The ratio of large particles refers to the ratio B/A of total weight A of the cordierite forming material to the cumulative weight B of particles included in the cordierite forming material having sizes of 100 μm and larger.

As the cordierite forming material, talc, fused silica and aluminum hydroxide are used. As the pore forming material, unexpanded material, expanded material and/or carbon are used. The unexpanded material consists of encapsulized hydrocarbons that expand 40 times in volume at a temperature from 80 to 100° C. For the expanded material, expandable beads that had been expanded with the unexpanded material added beforehand are used.

Predetermined quantities of an organic binder and water were added to a basic stock material consisting of the cordierite forming material and the pore forming material, and the mixture is then kneaded. Then the paste obtained by kneading was formed by a known honeycomb extrusion molding machine and was cut into desired lengths. The preforms that have been cut were dried with an induction heating drier, and were fired at 1400° C. for ten hours thereby to obtain the honeycomb structure. The honeycomb structure was provided with plugs made of a ceramic material in a checkerwork pattern on the end faces.

Then the exhaust gas purifying filter of honeycomb structure was made by adding platinum supported thereon as the noble metal catalyst.

The exhaust gas purifying filters thus obtained were measured for porosity and mean pore size, total volume of pores and the volume of pores that are not smaller than 100 μm. Measurements were also made on the condition of capturing the particulate matter, pressure loss, capturing efficiency and strength.

The porosity and mean pore size were measured by using a porosimeter of mercury injection type. Pressure loss was measured with a pressure measuring instrument using compressed air supplied at a rate of $2m^3$/min. Capturing efficiency was calculated as the ratio of the quantity of captured soot, that was generated by a soot generating device and resembled the particulate, to the quantity of soot that leaked, by using a pressure measuring instrument similar to that described above.

The capturing condition was checked by observing a cross section of the exhaust gas purifying filter with an electron microscope to see whether soot had entered the inside of the filter or not.

The strength was determined by measuring the ultimate strength of the exhaust gas purifying filter before breakage with an isostatic measuring instrument.

Results of these measurements are shown in Table 3 and Table 4.

TABLE 1

Mixing proportion

| Samples | Cordierite forming material | | | Pore forming material | | |
|---|---|---|---|---|---|---|
| | Talc | Fused silica | Aluminum hydroxide | Unexpanded material | Expanded material | Carbon |
| 1 | 38 | 18 | 44 | 2 | — | 20 |
| 2 | 38 | 18 | 44 | 2 | — | 20 |
| 3 | 38 | 18 | 44 | 2 | — | 10 |
| 4 | 38 | 18 | 44 | — | — | 10 |
| 5 | 38 | 18 | 44 | 2 | — | — |
| 6 | 38 | 18 | 44 | 5 | — | 20 |
| 7 | 38 | 18 | 44 | — | 5 | 20 |
| 8 | 38 | 18 | 44 | — | 5 | 20 |
| 9 | 38 | 18 | 44 | 5 | 5 | 20 |
| 10 | 38 | 18 | 44 | 10 | 20 | — |

(% by weight)

TABLE 2

Mean particle size and cumulative weight ratio

| Samples | Cordierite forming material (μm) | | | Cumulative weight ratio of cordierite forming material (*) |
|---|---|---|---|---|
| | Talc | Fused silica | Aluminum hydroxide | |
| 1 | 20 | 30 | 10 | 0 |
| 2 | 20 | 40 | 10 | 0 |
| 3 | 30 | 30 | 10 | 0 |
| 4 | 30 | 40 | 10 | 0 |
| 5 | 40 | 30 | 10 | 0.02 |
| 6 | 40 | 40 | 10 | 0.02 |
| 7 | 40 | 40 | 10 | 0.02 |
| 8 | 60 | 40 | 10 | 0.05 |
| 9 | 60 | 40 | 10 | 0.05 |
| 10 | 100 | 100 | 10 | 0.28 |

Note
(*): Cumulative weight of cordierite forming material is 1

TABLE 3

| Samples | Porosity (%) | Mean particle size (μm) | Pressure loss (KPa) | Capturing efficiency (%) | Condition of capturing | Strength (MPa) |
|---|---|---|---|---|---|---|
| 1 | 50 | 25 | 0.54 | 95 | accumulated only on the surface | 2.1 |
| 2 | 52 | 27 | 0.52 | 95 | accumulated only on the surface | 1.6 |
| 3 | 48 | 30 | 0.59 | 93 | infiltrated the inside | 1.9 |
| 4 | 46 | 32 | 0.61 | 94 | infiltrated the inside | 3.1 |
| 5 | 38 | 43 | 0.76 | 90 | infiltrated the inside | 3.5 |
| 6 | 66 | 46 | 0.42 | 88 | infiltrated the inside | 1.2 |
| 7 | 72 | 48 | 0.40 | 88 | infiltrated the inside | 0.9 |
| 8 | 74 | 50 | 0.38 | 89 | infiltrated the inside | 1.0 |
| 9 | 78 | 50 | 0.35 | 87 | infiltrated the inside | 0.8 |
| 10 | 84 | 72 | 0.31 | 55 | infiltrated the inside | 0.3 |

TABLE 4

| Samples | Total volume X of pores | Volume Y of pores that are not smaller than 100 μm | Y/X |
|---|---|---|---|
| 1 | 0.40 | 0 | 0 |
| 2 | 0.43 | 0 | 0 |
| 3 | 0.36 | 0 | 0 |
| 4 | 0.34 | 0 | 0 |
| 5 | 0.24 | 0 | 0 |
| 6 | 0.78 | 0.03 | 0.04 |
| 7 | 1.00 | 0.02 | 0.02 |
| 8 | 1.10 | 0.05 | 0.05 |
| 9 | 1.42 | 0.05 | 0.04 |
| 10 | 2.10 | 0.29 | 0.14 |

As will be seen from Tables 1 through 4, samples 6 through 9 have values of porosity in a range from 55 to 80%, mean pore sizes in a range from 30 to 50 μm and ratios Y/X of 0.05 or less, showing that the particulate matter infiltrated the inside of the porous walls, and satisfy all other requirements.

Samples 1 and 2 have small mean pore sizes less than 30 μm and therefore the particulate matter accumulates on the surface of the porous walls, hardly infiltrating the inside thereof.

In samples 3 through 5, although the particulate matter infiltrates the inside of the porous walls, pressure loss is too high to be practically applicable because of the low porosity of less than 55%.

Samples 6 through 9 show far lower pressure loss than samples 1 through 5, due to the mean pore size of 30 μm or larger and the increased quantity of the pore forming material, and satisfy all other requirements.

Sample 10 has mean pore size larger than 50 μm due to the large particle sizes of talc and fused silica and high content of the pore forming material. As a result, the particulate matter passes through the porous walls leading to low capturing efficiency. Due also to a low strength, this sample is not practically useful.

What is claimed is:

1. A method of manufacturing an exhaust gas purifying filter, made of a ceramic material in a honeycomb structure, comprising introduction passages for introducing exhaust gas that includes particulate matter emitted from an internal combustion engine, porous walls that collect said particulate matter and exhaust passages for exhausting the exhaust gas after the particulate matter has been removed therefrom, with said porous walls supporting a catalyst for oxidizing and removing said particulate matter, the porosity of the porous walls being in a range from 55 to 80%, and mean pore size being in a range from 30 to 50 μm, while the total volume X of the pores included in said exhaust gas purifying filter and the volume Y of the pores that are not smaller than 100 μm satisfy the relation of inequality $Y/X \leqq 0.05$ wherein said exhaust gas purifying filter is made by firing a preform that is formed in honeycomb structure from a mixture of ceramic powder and a foaming material so that the foaming material expands during the firing process, and adding the catalyst to be supported thereon, and said foaming material is a mixture of a material of which 5 to 80% has been already expanded and an unexpanded material that expands at a temperature not higher than 100° C.

2. The method of manufacturing the exhaust gas purifying filter according to claim 1, wherein said mixture includes carbon added thereto for the purpose of forming the pores.

3. The method of manufacturing the exhaust gas purifying filter according to claim 1, wherein at least one kind of material selected from among cordierite, silicon carbide and zirconium phosphate powder is used as said ceramic powder.

4. The method of manufacturing the exhaust gas purifying filter according to claim 3, wherein when one of the materials selected for said ceramic powder is cordierite. said cordierite is formed by firing a mixture of talc, fused silica and aluminum hydroxide.

5. The method of manufacturing the exhaust gas purifying filter according to claim 4, wherein the mean particle size of said talc is in a range from 30 to 200 μm the mean particle size of said fused silica is in a range from 30 to 200 μm and the mean particle size of said aluminum hydroxide is in a range from 5 to 20 μm.

6. The method of manufacturing the exhaust gas purifying filter according to claim 3, wherein when one of the materials selected for said ceramic powder is cordierite. said cordierite is formed by firing a mixture of talc, fused silica and aluminum hydroxide, the mean particle size of said aluminum hydroxide is set in a range from 5 to 20 μm, and the total weight A of all particles included in the mixture and the cumulative weight B of particles included in the mixture having sizes of 100 μm and larger satisfy the relation of inequality $B/A \leqq 0.05$.

* * * * *